June 23, 1925.
S. M. FAIRCHILD
1,543,208
EXPOSURE DEVICE FOR PHOTOGRAPHIC CAMERAS
Filed Aug. 14, 1919     6 Sheets-Sheet 1
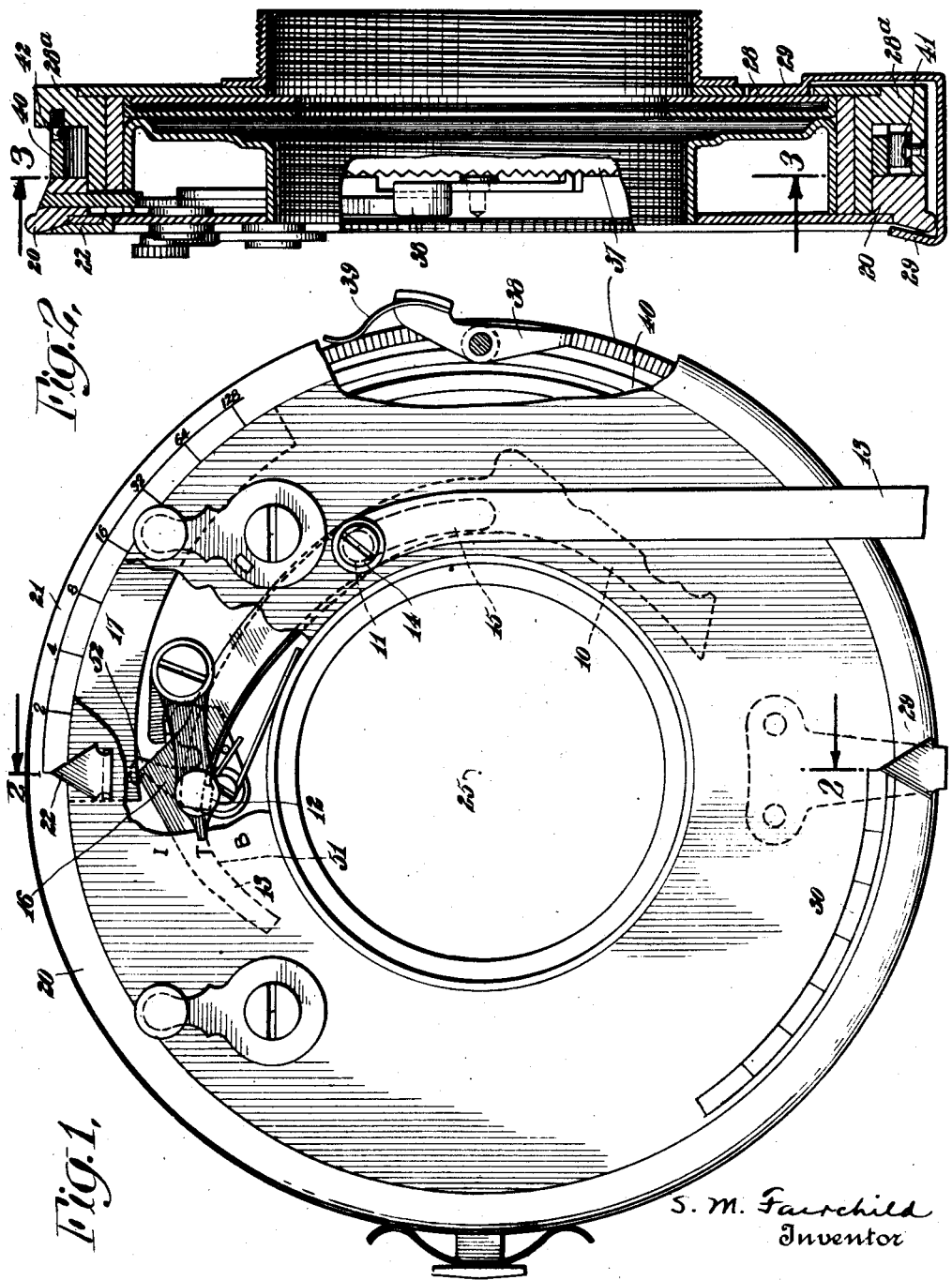
S. M. Fairchild
Inventor
By his Attorneys
Kerr, Page, Cooper & Hayward

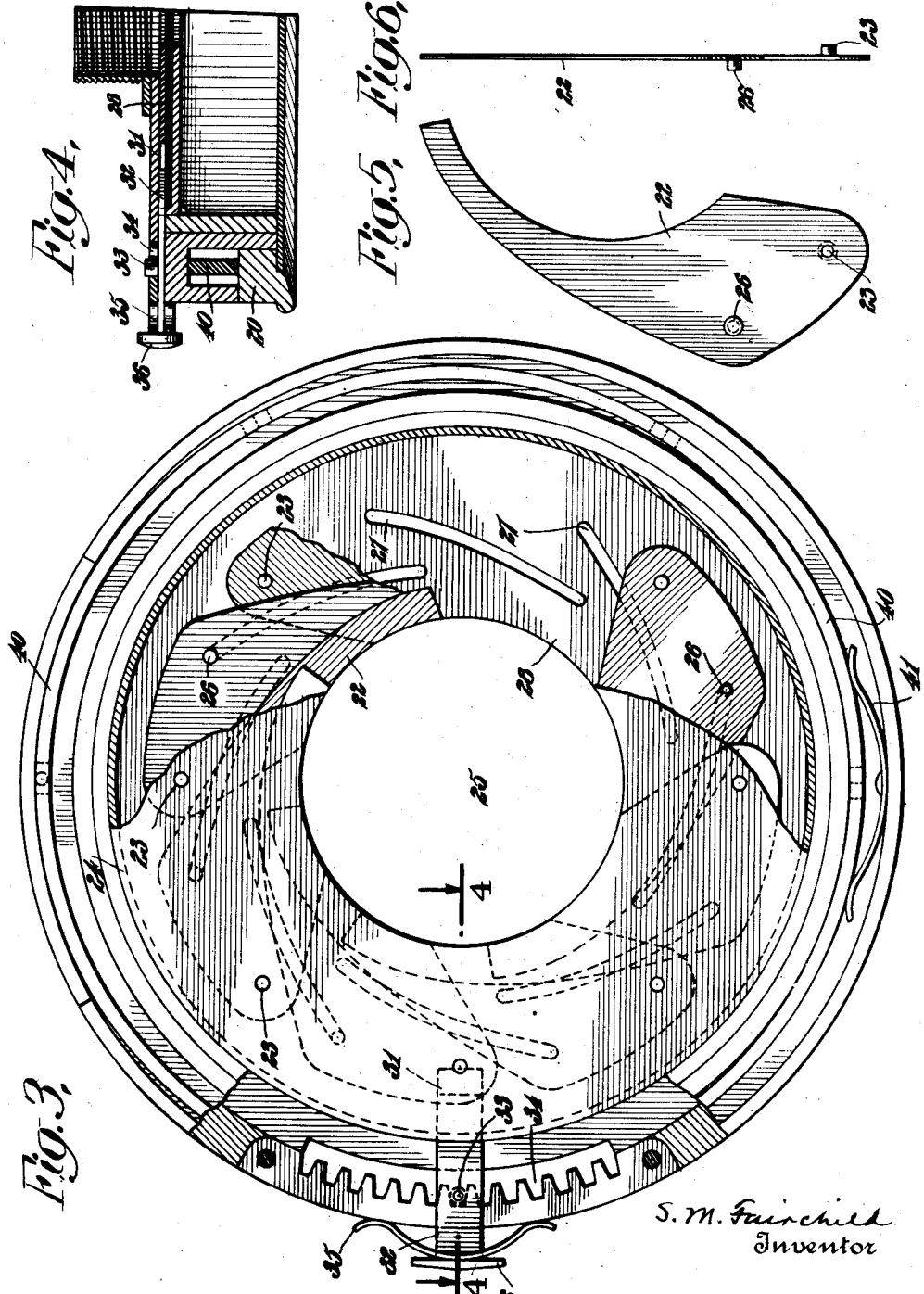

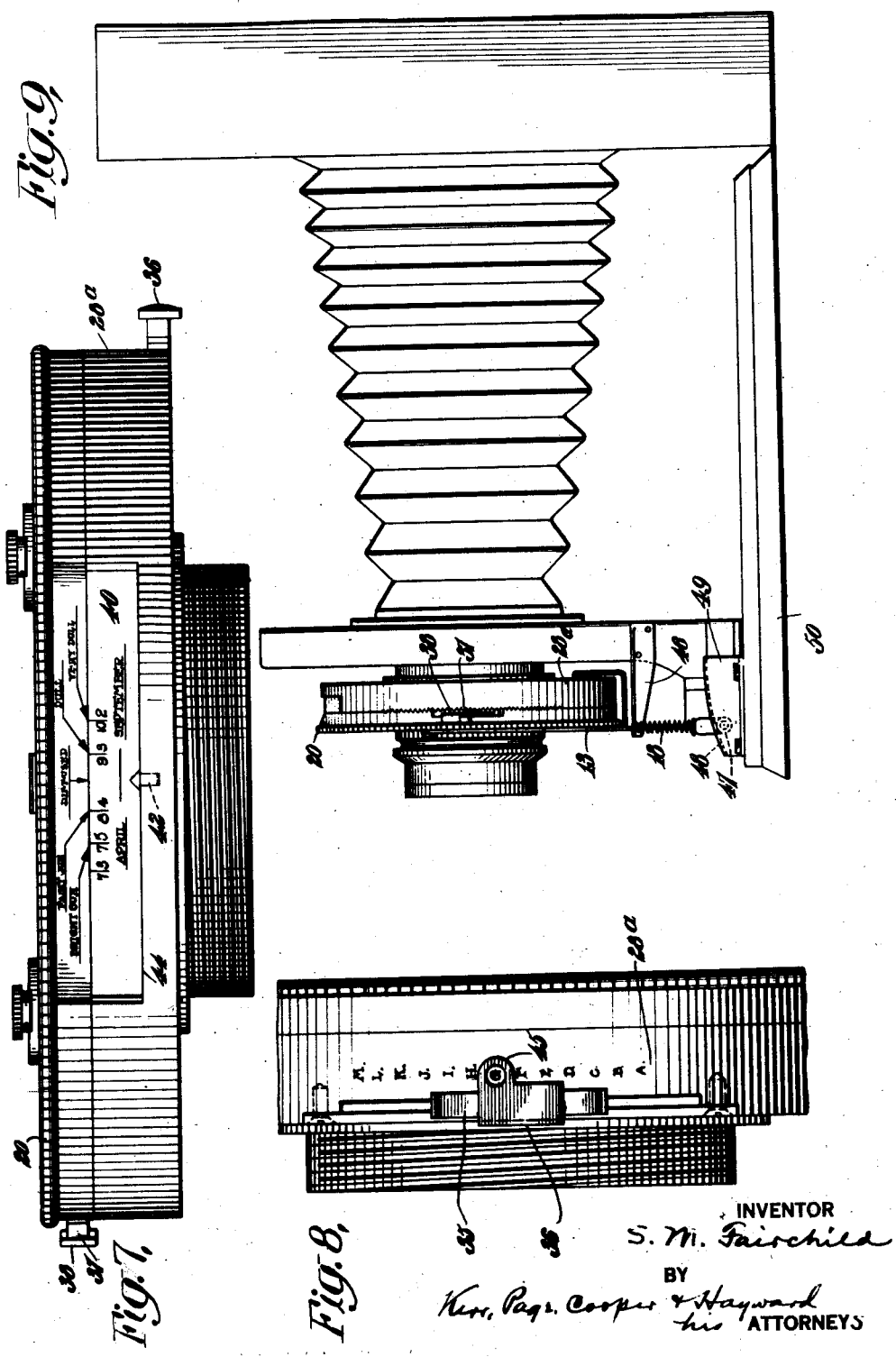

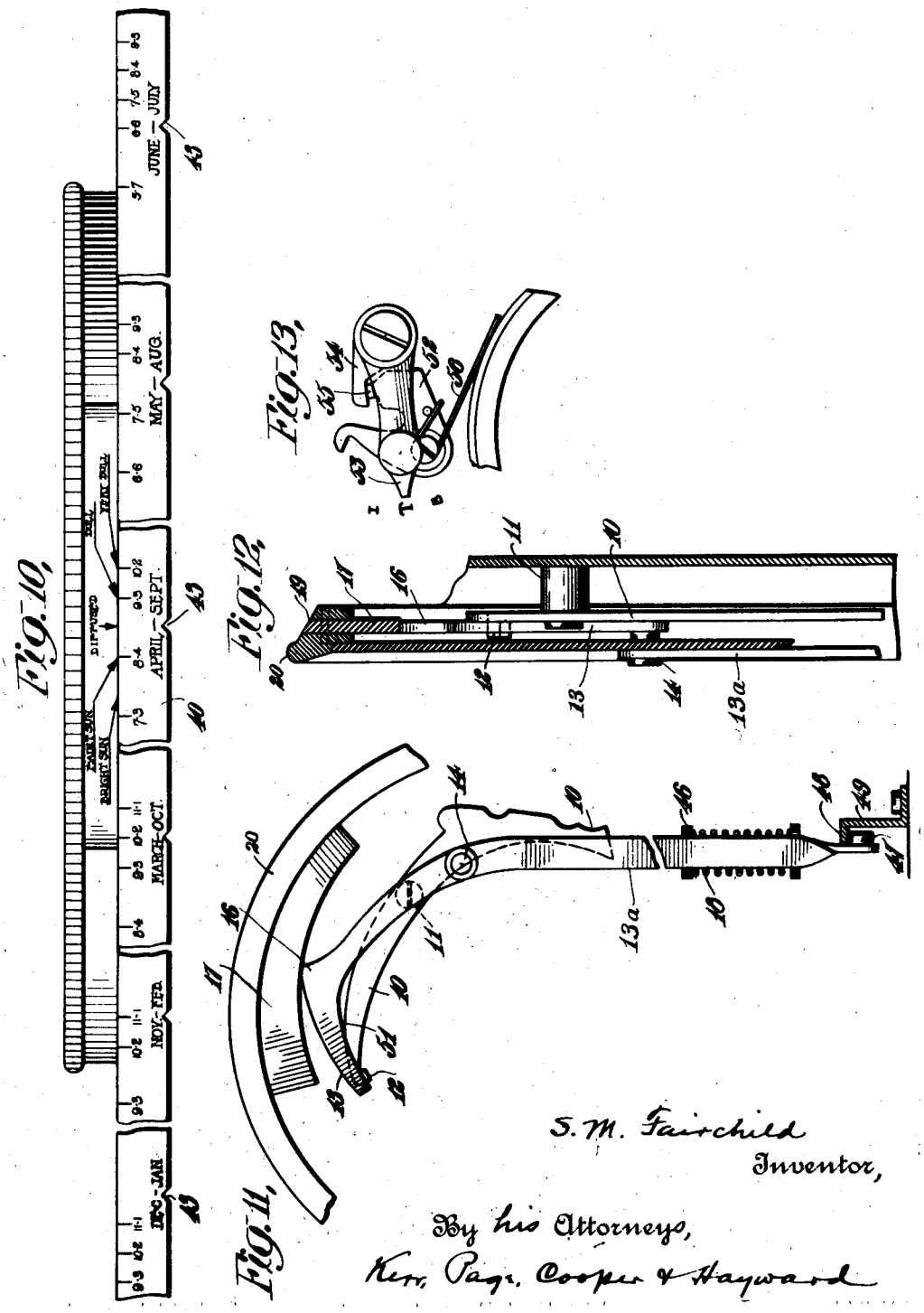

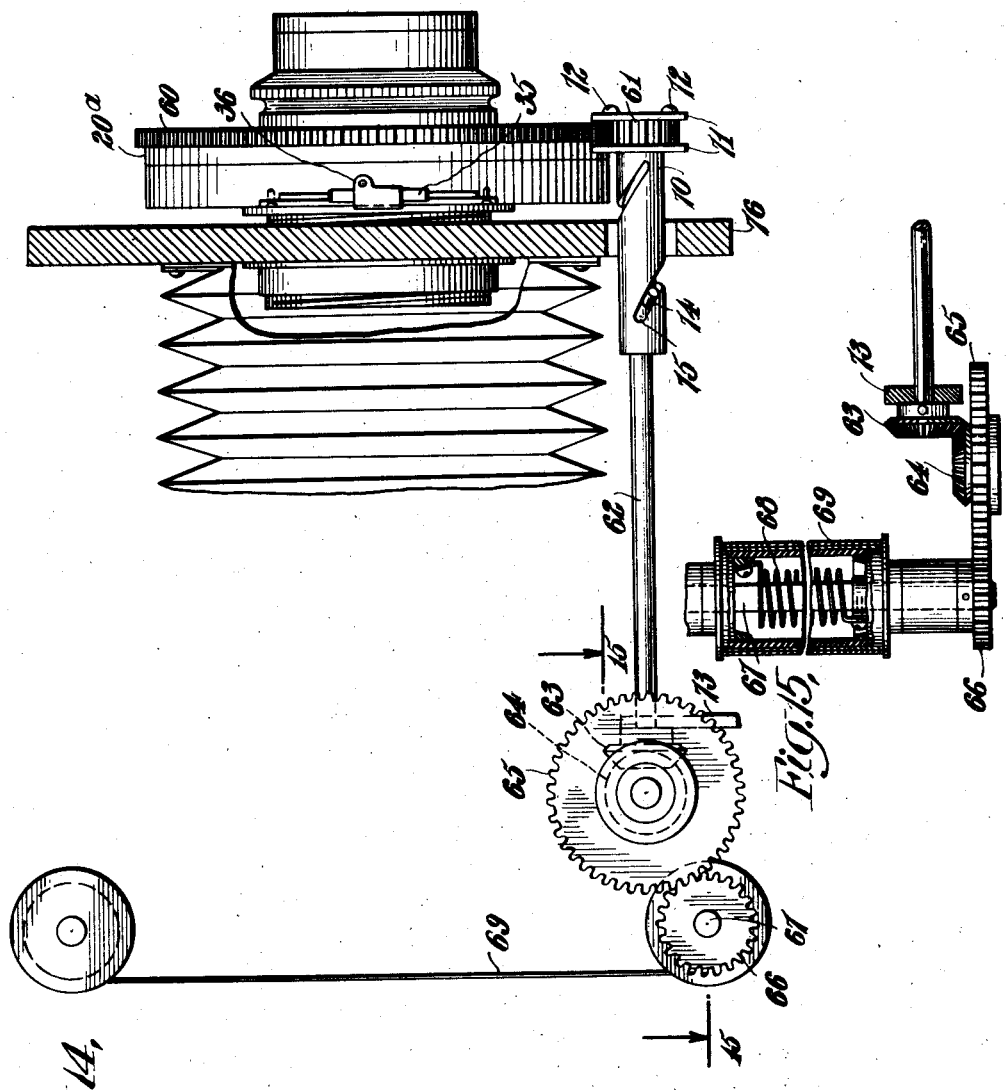

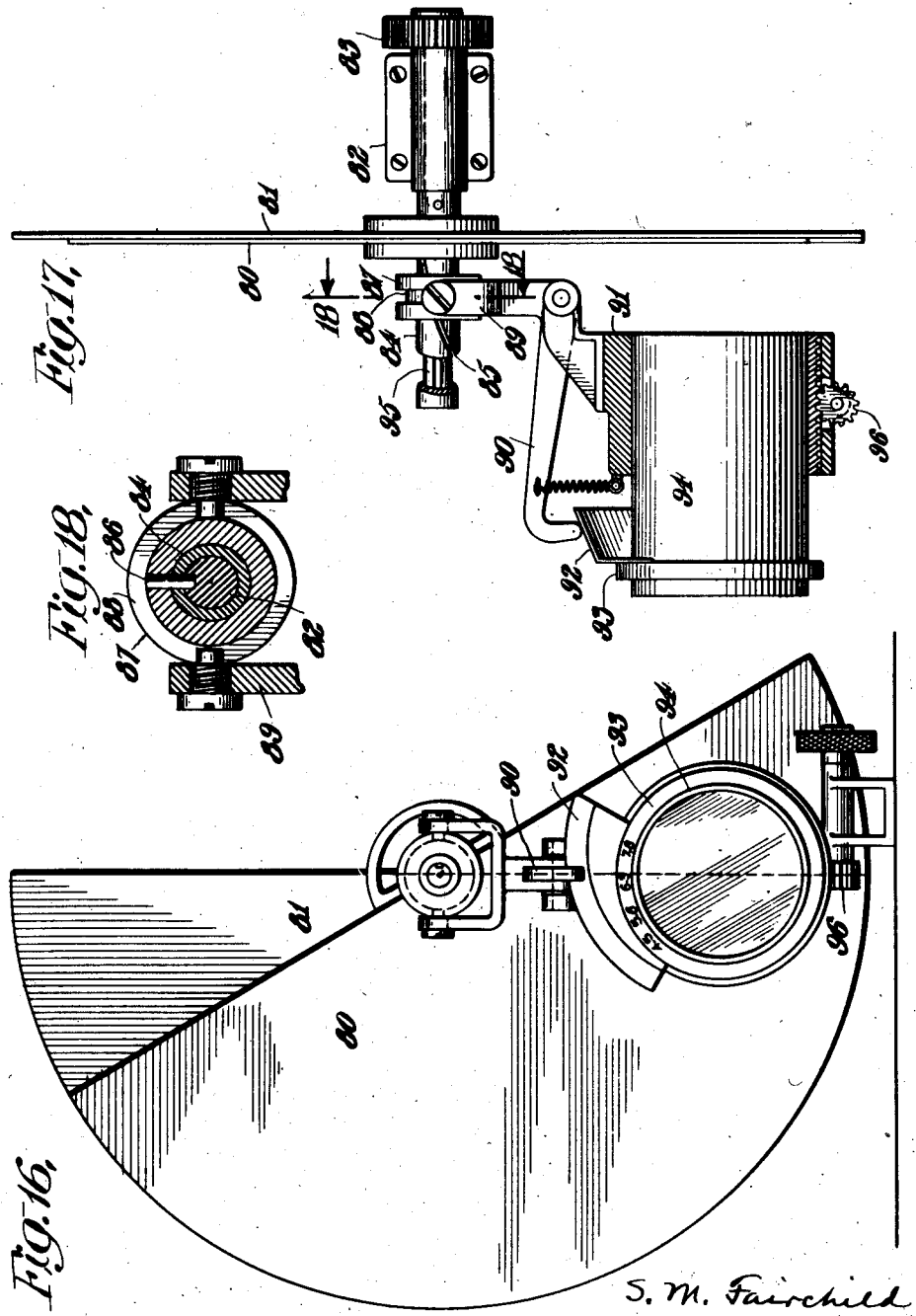

Patented June 23, 1925.

1,543,208

UNITED STATES PATENT OFFICE.

SHERMAN MILLS FAIRCHILD, OF ONEONTA, NEW YORK.

EXPOSURE DEVICE FOR PHOTOGRAPHIC CAMERAS.

Application filed August 14, 1919. Serial No. 317,425.

*To all whom it may concern:*

Be it known that I, SHERMAN M. FAIRCHILD, a citizen of the United States, residing at Oneonta, in the county of Otsego and State of New York, have invented certain new and useful Improvements in Exposure Devices for Photographic Cameras, of which the following is a full, clear, and exact description.

This invention relates to photographic shutters, or exposure-devices in general, and its chief object, briefly stated, is to provide a shutter which will enable the inexperienced photographer, and aid the skilled operator, to give correct exposure to the plate or film without recourse to a separate exposure meter or exposure calculator, or like device. For this purpose I provide a connection between the diaphragm and the speed-varying mechanism of the shutter so that the two operate in a compensating manner. Then, if the operator adjusts the speed-varying mechanism, intentionally or unintentionally, to give a longer or shorter exposure, the diaphragm will be simultaneously adjusted to make the working aperture of the lens enough smaller or larger, as the case may be, to give a correct exposure. Or, if the operator adjusts the diaphragm, for example, "stopping down" to give greater depth of field, the speed of the shutter is correspondingly altered, automatically, to compensate for the change in the diaphragm aperture. The connection between the two mechanisms or devices is variable, however, so that in the preliminary setting of the parts the operator can take account of the conditions upon which shutter-speed and lens-aperture chiefly depend, namely, the month of the year, the hour of the day, and the conditions of the light, whether bright, diffused, dull, etc. Having made this preliminary adjustment for the conditions prevailing at the time, it is then unnecessary to adjust the speed to any particular time or the diaphragm to any particular aperture. On the contrary, the operator can, so far as concerns the total amount of light reaching the plate, disregard both speed and diaphragm, since at every speed (within certain limits, as explained hereinafter) the diaphragm will have the aperture proper for that speed under the existing conditions of month, hour and light; and conversely, at every diaphragm-opening the shutter-speed will be proper for that opening.

It is well understood that in general a near object reflects less light to the lens for transmission to the plate or film than does a distant object. Moreover, as the lens is drawn out to focus on a near object, the ratio of the diameter of its effective aperture to the focal length of the lens decreases. Thus when the lens is focused on a distant object the diameter of its effective aperture may be, say, one-eighth of the focal length of the lens. If, now, the lens is focused on a near object its effective focal length is increased and the above ratio of 1/8 is decreased. This means that a unit area of the plate would receive less light than before; and hence, if it is desired to keep the light-effect constant the diaphragm opening should be increased or the exposure-time lengthened, or both. My invention accordingly provides means to compensate automatically for the distance of the object, and if desired, for the less amount of light reflected to the lens by a near object. Preferably this compensation is effected by means acting upon the speed-varying mechanism in such manner as to lengthen the exposure-time as the lens is drawn out in focussing.

A convenient and effective embodiment of the invention, applied to a well known type of shutter, is illustrated in the accompanying drawings, in which Fig. 1 is a front view of the shutter, with portions of the outer casing broken away to show the mechanism.

Fig. 2 is a section on line 2—2 of Fig. 1, looking in the direction of the arrows.

Fig. 3 is a section about on line 3—3 of Fig. 2, looking in the direction of the arrows.

Fig. 4 is a detail sectional plan view on line 4—4 of Fig. 3.

Fig. 5 is a front view and Fig. 6 an edge view of one of the diaphragm leaves or blades.

Fig. 7 is a plan view of the complete shutter; and Fig. 8 is a side view from the right of Fig. 1.

Fig. 9 is a side view of the shutter mounted on a camera, with means for varying the shutter-speed as the lens is moved in and out in focussing.

Fig. 10 is a development, on a flat surface, of one of the adjusting rings of the shutter.

Fig. 11 is a fragmentary view of part of the speed-varying mechanism, illustrating the effect produced upon the same by moving the lens in focussing.

Fig. 12 is a side view of the part shown in Fig. 11.

Fig. 13 is a fragmentary view showing the mechanism provided to give "time", "bulb", or "instantaneous" exposures.

Fig. 14 is a fragmentary side view, somewhat diagrammatic in character, showing the invention applied to a camera having a focal-plane shutter.

Fig. 15 is a detail section about on line 15—15 of Fig. 14.

Fig. 16 is a fragmentary front view showing the invention applied to a motion picture camera; and Fig. 17 is a side view of the same.

Fig. 18 is a detail section on line 18—18 of Fig. 17.

In the type of shutter illustrated, the duration of the exposure, that is, the shutter speed, depends upon the angular position of the curved timing member or lever 10, Figs. 1, 11 and 12, which is pivoted at 11. At its upper end this member or lever has a forwardly bent finger 12 underlying the toe of a member 13 (on the inside of the shutter) which carries a stud 14 fitted to move up and down in a curved slot 15 in the front of the shutter casing. The heel 16 of the controlling member 13 bears on the underside of a curved cam 17 capable of adjustment in a circular path about the axis of the shutter, as described hereinafter. A spring 18, Figs. 9 and 11, tends to raise the member 13, holding it at all times against cam 17; and another spring (not shown) tends to swing the timing lever 10 clockwise, holding the finger 12 at all times in contact with the toe of member 13. Evidently, as the cam is moved to the left (Fig. 1) the member 13 is depressed, thereby swinging lever 10 counterclockwise. This lengthens the exposure. On the other hand, movement of the cam toward the right permits lever 13 to rise, which in turn permits member 10 to swing clockwise, thereby shortening the exposure. The cam is fixed in a circumferential slot 19 (Fig. 12) in a ring 20 which is on the outside of the shutter casing and can be shifted rotatively by the hand. The ring may carry a scale, as 21, Fig. 1, upon which the speed is indicated by an index or pointer 22, on the outside of the shutter, as the ring is shifted. By preference the contour of the cam is such that with equal divisions on the scale (in other words, with equal movements of the ring) each exposure-time is one-half the preceding or twice the succeeding time. Thus in the shutter illustrated the lowest speed, marked "1" on the scale, is one second.

The next, marked "2," is one-half second; the next, marked "4," is one-fourth second; etc.

The diaphragm is of the iris type, composed of leaves 22 pivoted at 23 on a fixed plate 24, Figs. 2 and 3, around the lens opening 25. Each leaf has a stud 26 engaging one of a series of curved slots 27 in a rotatable actuating disk 28, so that as the latter is turned the leaves will be swung in or out relatively to the lens aperture, as will be readily understood. The disk 28 is just inside the shutter casing, at the rear, and is provided with a pointer 29, traversing a scale 30 on the camera front, which may have its usual "f" numbers, as 4.5, 5.6, 8, 11, etc.

The slotted disk 28 is also connected, in the following manner, to a rotatable ring 28ᵃ on the outside of the shutter. As shown in Figs. 3 and 4, the disk 28 is provided with a radial recess 31, in which is a finger 32, capable of radial movement in said recess, and provided with a stud 33 adapted to engage one or another of a series of recesses or notches 34 in the shutter-speed adjusting annulus 20. A spring 35, arranged under and carried by the head 36 of the slide 32, serves to hold the slide yieldingly in its outer position, with the stud 33 engaging a notch in the annulus 20. It will therefore be seen that rotation of ring 28ᵃ varies the area of the diaphragm aperture.

Ring 20, which, it will be remembered, controls the shutter-speed or exposure-time, is connected to ring 28ᵃ in the following manner. At one side of the shutter the edge of ring 28ᵃ is serrated, as shown at 37 in Figs. 1, 2 and 9, and on ring 20 is pivoted clip 38 held in engagement with the serrations by a spring 39. It will therefore be seen that when the ring 20 is rotated to vary the shutter speed the ring 28ᵃ is also rotated, thereby rotating the diaphragm-actuating disk 28 and consequently altering the area of the diaphragm. When it is desired to vary the speed without affecting the diaphragm, or to vary the diaphragm without affecting the speed, the clip 38 is disengaged from the serrations 37 by pressure of the finger, thus permitting either ring to be turned without turning the other.

The relation between shutter-speed and diaphragm-aperture for correct exposure depends, as previously stated, chiefly upon the month of the year, the hour of the day, and the condition of the light. To take account of these factors in setting rings 20 and 28ᵃ relatively to each other, I provide a ring 40, Figs. 2, 3 and 7, just inside of ring 28ᵃ and normally held up, in an eccentric position relative to ring 28ᵃ by a spring 41 at the bottom. A lug 42, carried by ring 28ᵃ normally engages one or another of series of notches 43, Fig. 10, in the edge of ring 40, thereby holding the latter stationary relatively to the other. Ring 40 is visible at the top of the shutter through an opening 44 in ring 28ª, and is marked with the months of the year and with graduations corresponding to certain hours of the day, as clearly shown in Figs. 7 and 10. In the latter figure, in which ring 40 is shown developed on a flat surface, it will be seen that the hour-graduations are different for the different pairs of months, since the actinic power of sunlight varies with the season of the year as well as with the hour of the day. For example, the graduation marked 8–4 (meaning 8 a. m. and 4 p. m.) for April–September is marked 9–3 in March–October, because of the fact that at these hours in the months named the actinic power of the light is substantially the same.

The light conditions, for instance "bright sun, faint sun, diffused, dull, and very dull," are marked on the ring 20 opposite the opening 44, with arrows or equivalent markings to register with one or another of the graduations on ring 40.

The operation of the shutter is as follows: Pressing down the ring 40 with his finger until the ring is disengaged from the lug 42, the operator turns the ring until the desired month, for example September, as in Fig. 7, is brought to the opening 44, and allows the ring to re-engage the lug. Grasping the ring 20 and at the same time pressing the clip 38 to disengage the same from ring 28ª, he turns ring 20 or ring 28ª until the mark for the prevailing light-condition and the proper hour-graduation on ring 40 coincide, as for example " faint sun " and " 8–4 " as in Fig. 7. This operation alters the shutter-speed to suit the given diaphragm-aperture, or alters the aperture to suit the given shutter-speed, for the three factors, month, hour and light, as they exist at the time. Thereafter, as long as these factors remain the same, the operator need pay no attention to either diaphragm or speed, so far as correct exposure is concerned. For example, if for the purpose of photographing a moving object he increases the shutter-speed, the diaphragm-aperture is simultaneously increased to compensate for the shortened exposure-time. If he reduces the diaphragm aperture, the exposure-time is correspondingly lengthened.

It is important that the exposure-time and the diaphragm aperture vary inversely to each, so that if the exposure-time is doubled (changed, for example, from $\frac{1}{32}$ to $\frac{1}{16}$ of a second) the aperture will be halved in area. In the construction illustrated, in which the rings 20 and 28ª are rotated in unison, the cam 17 is so designed that the speed is halved for equal movements of the ring 20 from the lowest speed; that is, if a movement of, say, 10° from the 1 second position gives an exposure of ½ second, a movement of 20° will give an exposure of ¼ second, 30° will give ⅛ second, 40° will give $\frac{1}{16}$ second, and so on. Consequently the diaphragm ring 28ª should produce a like change in the diaphragm, which means that if a given movement of the time-ring 20 halves the exposure time, the same movement of the diaphragm ring should double the area of the diaphragm aperture. Accordingly the slots 27 in disk 28 are given a curvature which will produce this result, as can be readily done by taking into account the shape and size of the leaves 22, the positions of the pivots 23 and pins 26 relative to each other and to the center of rotation of the disk 28, etc. This method is on the whole simpler and more satisfactory than trying to design the cam 17 and, if necessary, the other parts of the speed mechanism, to suit diaphragm mechanisms as heretofore made.

The original setting of the diaphragm is effected independently of the shutter-speed mechanism, and depends upon the altitude and latitude of the locality, and upon the " speed " of the plate or film in use. To take care of these factors the ring 28ª may be provided with suitable marks, as for example the letters A, B, C, etc., Fig. 8, which can be read singly through an aperture lug 45 on the head 36 of slide 32. These letters may be considered to indicate different plate-speeds, different latitudes, and different altitudes. For instance, assume that the plate or film in use is of such speed that at latitude 40° N., and at sea level, or not more, say, than 5,000 ft. above, the diaphragm should be set at G. Pressing in the slide 32, the operator pushes the slide up until the letter G appears in the opening, as in Fig. 8. This rotates plate 28, as previously explained, and hence alters the diaphragm aperture without affecting the shutter-speed, and thus secures the proper relation between aperture and shutter speed. If he goes to the tropics it may be necessary to reduce the diaphragm-opening, in which case the slide 32 is shifted to a lower letter, say to B or C. If, still in the tropics, the camera is taken to a high altitude, the diaphragm-opening may require further decrease. On the other hand, a higher latitude, say 60° north or south, might require the diaphragm-opening to be increased. In this way the adjustments necessary or desirable for latitude, altitude and plate-speed can easily be made; it being understood that the different positions of the indicator 36 corresponding to these three factors are worked out in advance, as can be done by methods well understood by persons skilled in the art.

Controlling member 13 has an outer portion 13ª which extends down in front of the shutter, Figs. 1, 9 and 11, through a guidearm 46 and at its lower end carries a small roller 47 which, as the front of the camera is drawn out for use, comes under a cam-rib 48 on a plate 49 fixed on the bed 50. The spring 18 normally holds the member 13 in the highest position permitted by the cam 17, Fig. 11, and the rib 48 is so proportioned and arranged that when the camera front is at the so-called hyperfocal position the said rib does not affect the position of the member 13. But as the front is drawn forward to focus on nearer objects the rib draws member 13 down, as will be readily understood. Upon referring to Figs. 1 and 11 it will be seen that the finger 12 on the timing member 10 underlies the curved cam-edge 51 on the upper end of controlling member 13. Hence depression of the latter by the cam-rib 48 has the same effect as rightward movement of the speed-cam 17; that is, it rocks the timing member counterclockwise, as in Fig. 11, and so lengthens the exposure time, thus compensating for the increased distance of the lens from the plate or the lessened amount of light received by the lens from a near object, or both. It is to be understood, of course, that the cam-rib 48 is so shaped and proportioned as to make the proper alteration in the exposure time for the different positions of the lens.

The shutter illustrated herein contains a pivoted member 52, Figs. 1 and 13, the position of which determines whether the shutter will give "time", "bulb" or "instantaneous" exposures. In modifying the shutter to embody my invention, as herein described, I replace the usual circular or disk-cam by the cam 17 and to shift the member 52 I provide an arm or pointer 53, pivoted in the front of the shutter casing and having inside the casing a finger 54 equipped with a lug 55 overlying the tail of member 52, which latter is urged counterclockwise by a light spring 56. It will therefore be seen that by swinging arm 53 to one or another of the marks "I", "T", "B" on the front of the shutter will adjust the member 52 correspondingly, to give instantaneous, time, or bulb exposure, respectively.

The invention can also be applied to a shutter of the curtain or focal-plane type, preferably by connection with the curtain-driving spring. This method is illustrated, somewhat diagrammatically, in Figs. 14 and 15. In these figures the speed-changing ring 20ᵃ (corresponding to ring 20 in Fig. 1) is provided with gear teeth 60 meshing with a pinion 61 on a shaft 62 which at its rear end is connected by gears 63, 64, 65 and 66 to the shaft 67 to which one end of the driving spring 68 is connected. Hence rotation of the ring 20ᵃ will increase or decrease the tension of the spring and alter the velocity of the curtain 69 accordingly. The connection between ring 20ᵃ and the diaphragm mechanism may be the same as in the preceding figures. The pinion 61 is mounted on a sleeve 70 slidable on shaft 62, but both pinion and sleeve are held axially stationary relatively to gear 60 by the flanges 70 71 removably fixed to the pinion by screws 72. Shaft 62 is held against outward movement at a stop 73, and has a pin 74 extending into a helical slot 75 in sleeve 70. It will therefore be seen that since neither the shaft nor the sleeve can move axially when gear 20ᵃ is rotated, the rotation of the sleeve by the pinion 61 must rotate the shaft. On the other hand, if the lens-board 76 is moved in or out to focus the lens, the axial movement of the sleeve must rotate the shaft through the medium of the pin and helical slot, thereby altering the tension of the spring 68 according to the distance of the object on which the lens is focused.

Figs. 16, 17 and 18 illustrate, diagrammatically, a simple method of applying the invention to a shutter for motion picture cameras. In this case the shutter proper consists of two semi-circular plates, 80, 81, the latter fixed to shaft 82 which is rotated by pinion 83. The other is carried by a sleeve 84 which is adjustable relatively and axially on the shaft and a helical slot 85 engaged by a pin 86 carried by a collar 87 surrounding the sleeve and slidable thereon. The collar has a circumferential groove 88 engaged by a fork 89 on the vertical arm of a bell crank lever 90 fulcrumed on the lens-carrier 91 with its horizontal arm bearing on a cam 92 fixed on the diaphragm-adjusting ring 93 of the lens barrel 94. The pin 86 also extends into an axial groove 95 in shaft 82 to prevent rotation of the collar or the shaft relative to each other. It will now be seen that as the diaphragm ring 93 is turned to increase or decrease the diaphragm aperture the cam 92 will rock the bell crank lever 90, thereby shifting the collar 87 and pin 86 axially. This rotates the sleeve 84 and hence turns the blade 80 relatively to the blade 81 and so increases or decreases the shutter opening, as the case may be, to compensate for the change in the diaphragm aperture. The collar is also shifted axially, with like effect on the shutter opening, when the lens is adjusted in focussing by means of the rack and pinion mechanism 96.

It is to be understood that the invention is not limited to the embodiments herein specifically illustrated but can be embodied in other forms without departure from its spirit.

I claim:

1. In exposure-devices for photographic cameras, in combination, a shutter having speed-varying mechanism and adjustable diaphragm mechanism, a rotatively adjustable ring outside of the shutter and connected with the speed-varying mechanism to adjust the same and thereby vary the exposure time, a rotatively adjustable ring outside of the shutter and connected with the diaphragm mechanism to vary the working aperture, and means operatively connecting the two rings whereby adjustment of one produces a compensating adjustment of the other, said means being releasable at will to permit adjustment of one of said mechanisms independently of the other.

2. In exposure-devices for photographic cameras, in combination, a shutter having speed-varying mechanism; a shiftable member connected with said mechanism to adjust the same and thereby vary the exposure time, said member having graduations indicating different light-conditions; adjustable diaphragm mechanism; a shiftable member connected with the diaphragm mechanism to adjust the same and thereby vary the working aperture; means connecting the two members whereby adjustment of one produces a compensating adjustment of the other, said means being releasable to permit adjustment of one member independently of the other; and a shiftable device bearing hour-graduations, releasably connected with the second-mentioned member for adjustment independently of both said members and associated with the first-mentioned member whereby any graduation on the latter may be brought into coincidence with any graduation on said device.

3. In exposure-devices for photographic cameras, in combination, a shutter having speed-varying mechanism and diaphragm-mechanism to vary the working aperture; a manually rotatable ring carried by the shutter and connected with the speed-varying mechanism to vary the exposure-time, and bearing graduations indicating different light-conditions; a rotatable ring carried by the shutter and connected with the diaphragm mechanism to adjust the same; means connecting the two rings whereby adjustment of one produces a compensating adjustment of the other, but releasable to permit independent adjustment of the first ring; a manually rotatable ring between the other two rings, releasably connected with the second-mentioned ring and having hour-graduations associated with the graduations on the first-mentioned ring.

4. In exposure-devices for photographic cameras, in combination, a shutter having speed-varying mechanism and diaphragm-varying mechanism enclosed in a circular casing; a manually rotatable adjusting ring at the periphery of the casing at the front thereof, connected with one of said mechanisms and bearing graduations indicating different light-conditions; a rotatable adjusting ring behind the other at the periphery of the casing and connected with the other mechanism; manually releasable means connecting said rings for simultaneous adjustment of the two or adjustment of one independently of the other; and a ring rotatively adjustable between the other two rings and releasably connected with the second-mentioned ring, and bearing hour-graduations associated with the graduations on the first.

5. In exposure-devices for photographic cameras, in combination, a shutter having speed-varying mechanism including an adjustable timing-member which by its position determines the exposure-time; a movable front on which the shutter is mounted for focusing movement of the lens; a base carrying said front; a controlling-member carried by the shutter and connected with the timing-member to shift the same and thereby vary the exposure-time; and a cam carried by said base and arranged to cooperate with the controlling member, whereby to actuate the same and produce a compensating adjustment of the timing-member as the aforesaid front is moved in or out in focusing.

6. In exposure-devices for photographic cameras, in combination, a shutter having speed-varying mechanism including a pivotally adjustable timing-member which by its position determines the exposure-time; a controlling-member carried by the shutter and connected with the timing member to swing the same and thereby vary the exposure time; a movable front carrying the shutter; and a stationary cam adapted to cooperate with the controlling-member and actuate the same as the movable front is shifted in focusing, to produce a compensating adjustment of the timing-member.

In testimony whereof I hereunto affix my signature.

SHERMAN MILLS FAIRCHILD.